July 4, 1950  J. G. SCHLICHTER ET AL  2,514,190
MOLD-HANDLING DEVICE
Filed April 14, 1948  3 Sheets-Sheet 1
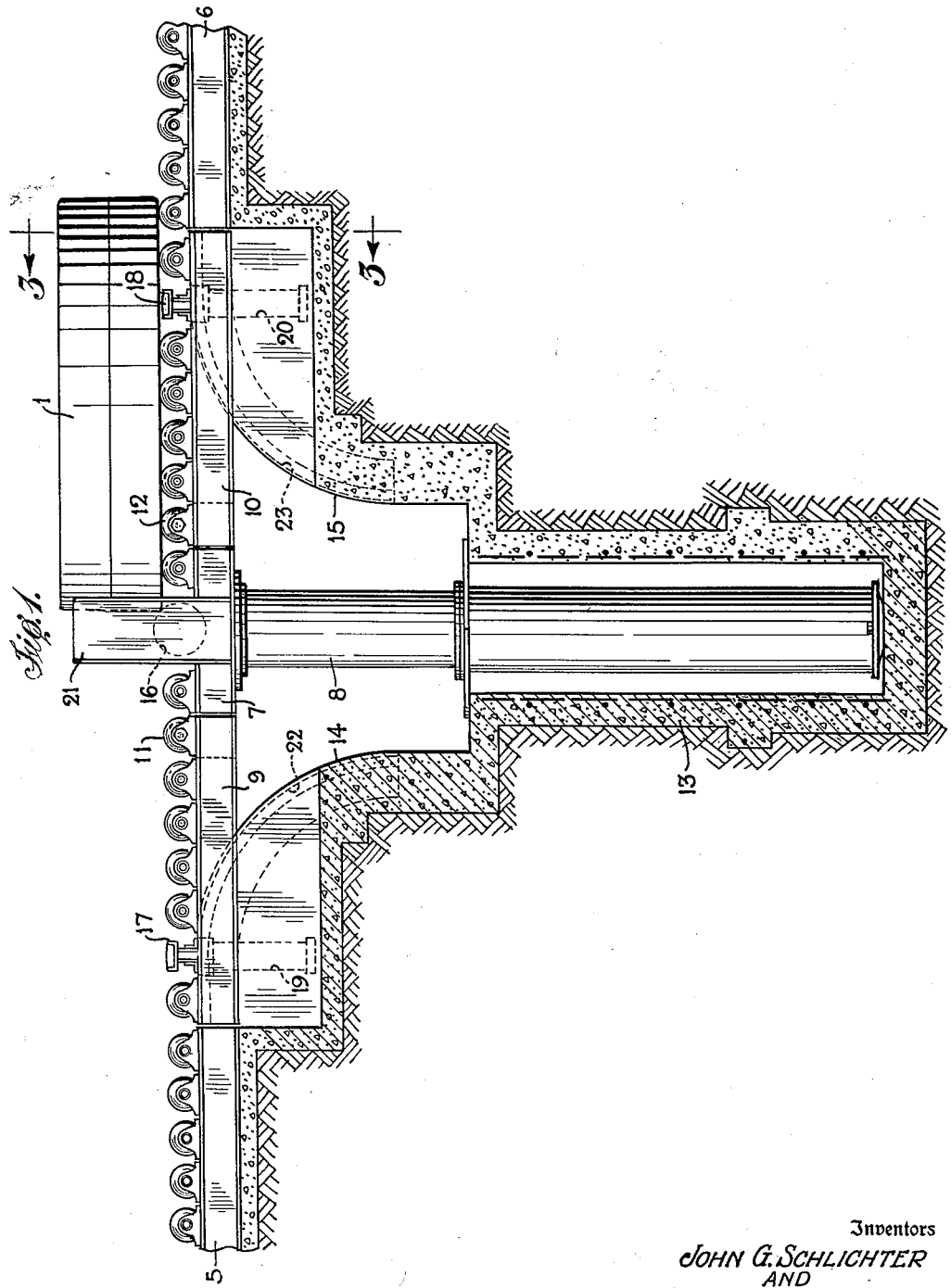
Inventors
JOHN G. SCHLICHTER
AND
KARL BECKER
By
Attorneys

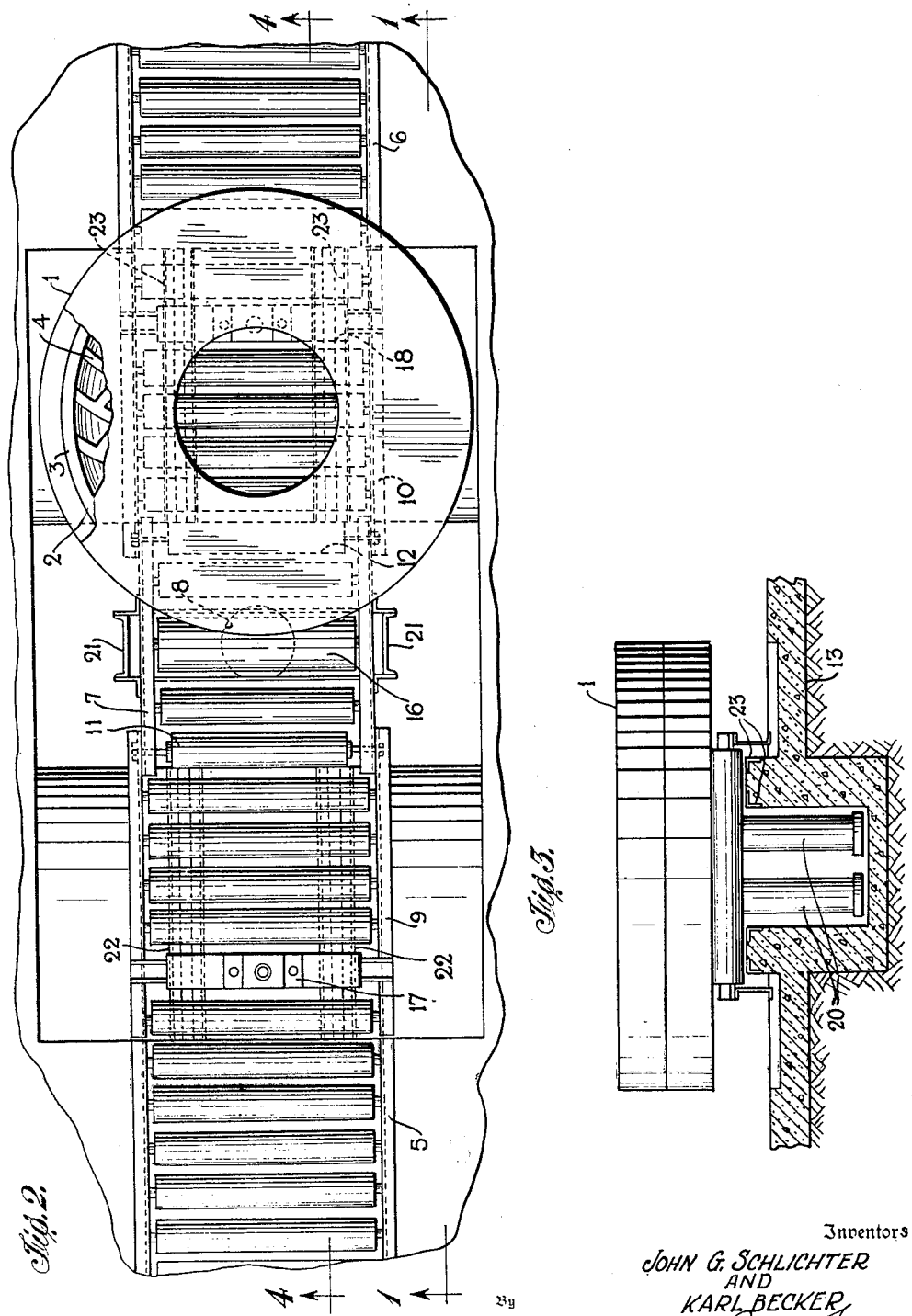

Inventors
JOHN G. SCHLICHTER
AND
KARL BECKER
By
Attorneys

Patented July 4, 1950

2,514,190

UNITED STATES PATENT OFFICE 2,514,190

MOLD-HANDLING DEVICE

John G. Schlichter, Akron, and Karl Becker, Cuyahoga Falls, Ohio, assignors to The Firestone Tire & Rubber Company, Akron, Ohio, a corporation of Ohio Application April 14, 1948, Serial No. 20,928

8 Claims. (Cl. 214—1)

This invention relates to a device for turning over heavy and bulky objects such as individual or dual molds employed in the vulcanization of vehicle tires. It is not unusual for such objects to weigh upwards of six tons and their handling incident to loading and maintenance has presented problems with serious implications to the workers and to the molds themselves.

Heretofore the necessary manipulations have been accomplished by more-or-less primitive methods such as the use of block and tackle supplemented by manual attention. This entailed undue time delays and serious hazards, and it is to the relief of such conditions that the present invention pertains.

It is therefore an object of the invention to accomplish the turning of heavy and bulky objects with a minimum of personal handling, another object being to attain the desired results through cooperation of the weight of the object itself.

Briefly the invention comprises a conveyor of articulated sections which drops and folds into a trough into which the object slides, turning upright in the process and proceeding to a complete flip-flop on straightening of the conveyor.

For a more detailed explanation of the invention, reference is had to the following description, and to the drawing, in which:

Fig. 1 is a section taken medially of the ground anchorage, and showing the turning apparatus and work in side elevation;

Fig. 2 is a top plan view of Fig. 1;

Fig. 3 is a section taken on the line 3—3 of Fig. 1;

Figure 4:
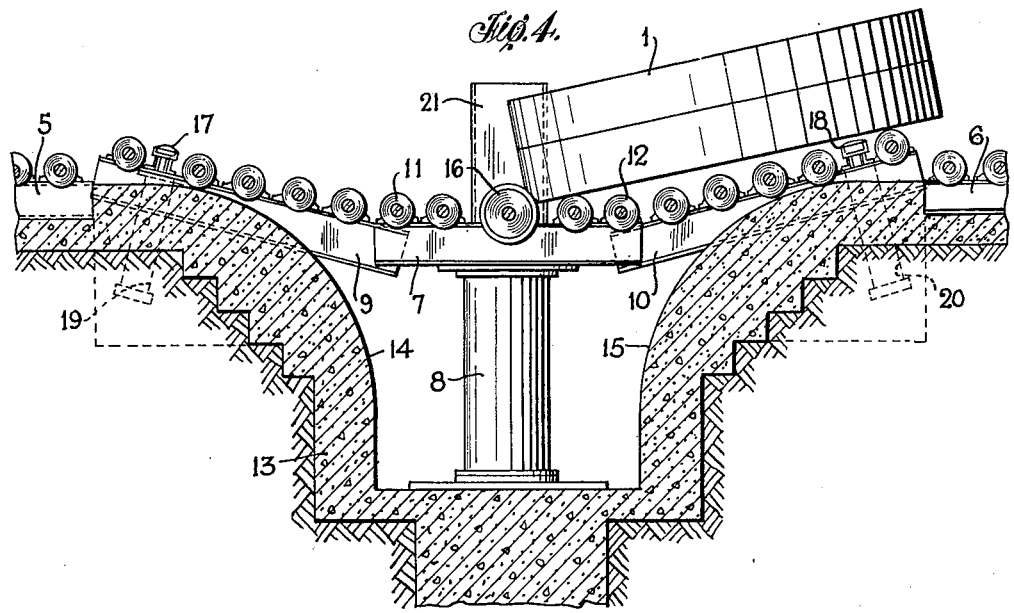
Fig. 4 is a sectional view taken on the line 4—4 of Fig. 2 and showing the conveyor in the initial stages of dropping and upending the work.

The work to be turned is shown generally at 1. As one representative of the type of objects advantageously handled, this comprises the center section of a dual mold having a cavity 2 in each face for reception of a molding insert 3 engraved as at 4 to provide treads in a tire. A cover piece and a bottom piece, each bearing a complementary insert, complete the mold, and each of these is also separately handled with convenience by the turning apparatus of the invention.

After completion of a vulcanization cycle and stripping of the mold, it must be cleaned and examined for wear or damage. This entails the turning operation under discussion.

For the turning operation, the mold is placed, by any convenient means, upon a conveyor comprising stationary channel sections 5, 6, and articulated sections including a fixed horizontal portion 7 carried by a hydraulic lift 8, and end sections 9, 10 each swingable about the extended shafts of the rollers 11, 12 respectively. The ends of sections 9, 10, abut sections 5, 6 respectively when in horizontal position, but are independent thereof.

Figure 5:
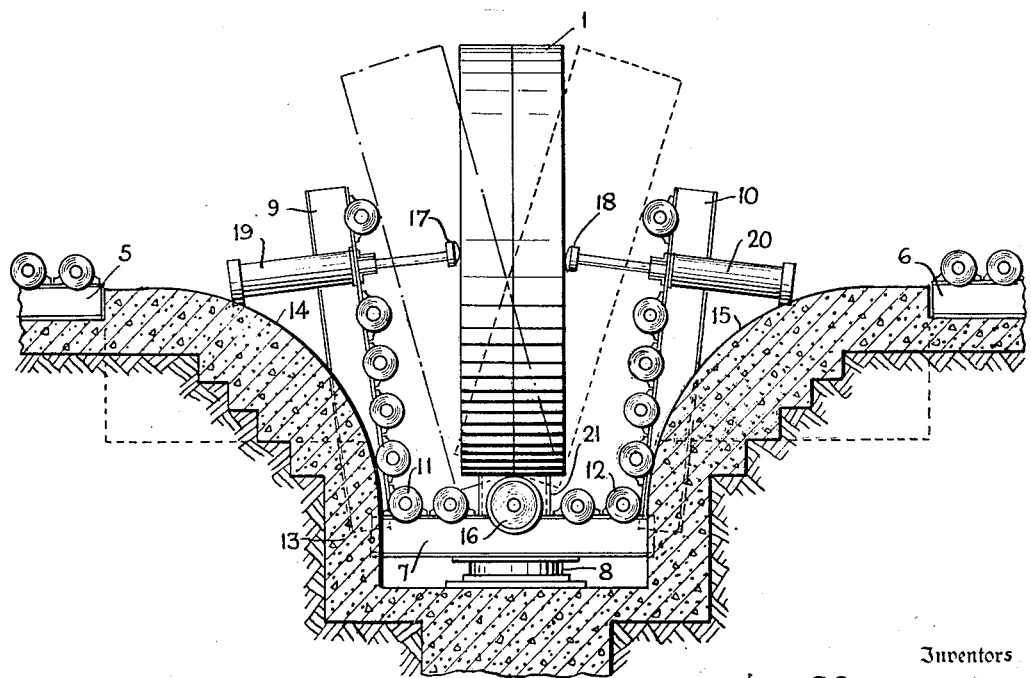
Fig. 5 is a view similar to Fig. 4 showing the upended work in full lines and the extreme positions thereof for lowered conveyor shown in phantom.

The lift is mounted in a pit having a concrete lining 13, the pit and liner being generally flared in the upper portion to accommodate the apparatus in its collapsing action. In this flared region the concrete liner is formed to provide pairs of arcuate runways 14, 15 having corner braces 22, 23 over which the articulated end sections 9, 10 rock in following the downward progress of the lift, actual contact with the runways being had through the rollers whereby sliding friction is avoided. Thus, as the lift and the central conveyor section are lowered into the pit the rollers of the articulated sections come successively into contact with the runways, the sections being gradually urged into the very nearly vertical position shown in Fig. 5, one of them carrying the work-piece with it and the latter engaging by an end face with the large central roller 16.

On complete lowering of the lift, the work will be in either one of the positions shown in phantom in Fig. 6. To complete the turning operation it is carried over dead center on the large roller 16 and brought again to a horizontal position by raising of the lift. The manipulation past dead center is accomplished by arms 17, 18 actuated by pairs of air cylinders 19, 20. In either of the reclining positions of the work shown in Fig. 5, the arms 17, 18 are advanced until each is in contact with the work. Then with proper control of the air valves the work is carried over dead center and eased into the other position without risk of damage to the work or the apparatus.

End gates 21 are provided at the top of the lift to prevent the work from rolling sidewise when inclined.

Operation

In summary, the operation is as follows: A workpiece 1 to be inverted is placed on the horizontally aligned conveyor sections 7, 10 and 6 with one corner of the work abutting the central roller 16. As the central section 7 of the conveyor is lowered with the lift 8, the rollers 12 will come successively into contact with the runways or cams 15, causing the section 10 to swing about the shafts of rollers 12 whereby the end roller of the swinging section 10 urges the work to swing about the fulcrum point at the roller 16. The work is thus eased gradually into an almost vertical position and will require only a comparatively slight force to carry over dead center so as to recline against the opposite side of the folded conveyor. To accomplish this the left pusher 17 is brought over against the work. When contact is made the right pusher 18 is urged forward while the pressure on pusher 17 is reduced. In this operation a certain balance of pressure is attained whereby the work is carried smoothly and continuously over dead center without excessive manipulation of the air valves. When the work has been carried over, it only remains to raise the lift and the apparatus retraces its actions, finally bringing the work again to a horizontal position, but being now turned through 180 degrees from its original position.

Other modes of applying the principle of my invention may be employed instead of the one explained, change being made as regards the mechanism herein disclosed, provided the means stated by any one of the following claims or the equivalent of such stated means be employed.

What is claimed is:

1. An apparatus for orienting heavy articles comprising a platform having an articulated end section, means to raise and lower the platform and a cam means to turn the said end section about its point of articulation as the platform is lowered, conveyor rollers on said platform, one of said rollers located in a region other than in the said end section being of greater diameter than the balance of the rollers.

2. An apparatus for upending and overturning heavy articles comprising a weight-lifting and lowering means, a platform carried by the lift in fixed, horizontal position, a pair of end sections on the platform, each articulated thereto and having a free, outward end, and a track for each of the end sections constructed and arranged to fold the end sections upwardly and toward the fixed platform as the said means is lowered.

3. In an apparatus as in claim 2, conveyor-roller means on said platform and end sections.

4. An apparatus as in claim 3, one of said rollers centrally of the platform extending above the level of the level of the balance of the rollers when the end sections are aligned with the platform.

5. In an apparatus as in claim 2, pusher means carried by the end sections and adapted to urge the work away from the end sections.

6. An apparatus for upending and overturning heavy objects comprising a hydraulic lift, a fixed, horizontal conveyor platform carried by said lift and having rollers, end conveyor sections articulated to the ends of said platform and also having rollers in planar alignment with the platform rollers in normal position of the apparatus, and arcuate guide means converging toward the platform in a direction downwardly of the lift whereby said end sections are folded inwardly upon lowering of the lift.

7. An apparatus as in claim 6, one of said rollers medially of the platform extending above the level of the balance of the rollers.

8. In an apparatus as in claim 6, pusher means carried by the end sections and adapted to urge the work away from contact with the said end sections whereby the work may be carried over dead center after upending.

JOHN G. SCHLICHTER.
KARL BECKER.

REFERENCES CITED

The following references are of record in the file of this patent:

UNITED STATES PATENTS

| Number | Name | Date |
|---|---|---|
| 1,168,313 | Kenworthy | Jan. 18, 1916 |
| 1,541,527 | Powell | June 9, 1925 |
| 1,843,852 | Troy | Feb. 2, 1932 |
| 2,294,531 | Winter et al. | Sept. 1, 1942 |
| 2,365,007 | Rideout et al. | Dec. 12, 1944 |
| 2,396,936 | Wylie | Mar. 19, 1946 |